United States Patent
Bickers et al.

(10) Patent No.: US 11,960,414 B2
(45) Date of Patent: Apr. 16, 2024

(54) WRITE PROTECTION FOR STORAGE CARTRIDGES

(71) Applicants: Richard Arthur Bickers, Bristol (GB); Curtis C. Ballard, Eaton, CO (US)

(72) Inventors: Richard Arthur Bickers, Bristol (GB); Curtis C. Ballard, Eaton, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 413 days.

(21) Appl. No.: 17/001,934

(22) Filed: Aug. 25, 2020

(65) Prior Publication Data

US 2022/0067218 A1 Mar. 3, 2022

(51) Int. Cl.
*G06F 12/14* (2006.01)
*G06F 3/06* (2006.01)

(52) U.S. Cl.
CPC ........ *G06F 12/1433* (2013.01); *G06F 3/0619* (2013.01); *G06F 3/0637* (2013.01); *G06F 3/0686* (2013.01); *G06F 3/0673* (2013.01)

(58) Field of Classification Search
CPC ...... G06F 21/80; G06F 3/0619; G06F 3/0637; G06F 3/0686; G06F 21/64; G06F 3/0673; G06F 12/1433
See application file for complete search history.

(56) References Cited

U.S. PATENT DOCUMENTS

| | | | | |
|---|---|---|---|---|
| 4,024,505 A | * | 5/1977 | Sperling | G06F 13/26 710/2 |
| 5,438,674 A | * | 8/1995 | Keele | G11B 7/0037 711/4 |
| 5,953,174 A | * | 9/1999 | Satou | G11B 33/144 360/69 |
| 6,611,394 B1 | * | 8/2003 | Kato | G11B 15/07 360/69 |
| 6,845,431 B2 | | 1/2005 | Camble et al. | |
| 7,580,950 B2 | | 8/2009 | Kavuri et al. | |
| 7,773,465 B2 | | 8/2010 | Goodman et al. | |
| 7,817,517 B2 | | 10/2010 | Tomikura et al. | |
| 9,170,745 B2 | | 10/2015 | Klein et al. | |
| 9,396,754 B1 | * | 7/2016 | Wong | G11B 15/6835 |
| 9,984,008 B1 | | 5/2018 | Akmal et al. | |
| 2003/0016609 A1 | | 1/2003 | Rushton et al. | |
| 2004/0120066 A1 | * | 6/2004 | Hashimoto | G11B 23/042 |

(Continued)

OTHER PUBLICATIONS

Coyne, L. et al.; "IBM Tape Library Guide for Open Systems"; Dec. 2018; 556 pages.

(Continued)

*Primary Examiner* — Jae U Yu
(74) *Attorney, Agent, or Firm* — Trop, Pruner & Hu, P.C.

(57) ABSTRACT

In some examples, a controller for a storage system separate from a host system checks whether a storage cartridge in a storage system is associated with an indication set, in an electronic memory, during a configuration operation in the storage system to indicate write protection is enabled for the storage cartridge. In response to determining that the storage cartridge is associated with the indication, the controller triggers the write protection for the storage cartridge to prevent writing of data to the storage cartridge if the storage cartridge already contains previously written data.

19 Claims, 4 Drawing Sheets

(56) References Cited

U.S. PATENT DOCUMENTS

| | | | |
|---|---|---|---|
| 2010/0031054 A1* | 2/2010 | Starr | G06F 21/6218 |
| | | | 713/189 |
| 2011/0019304 A1 | 1/2011 | Heineman et al. | |
| 2011/0051278 A1* | 3/2011 | Brume | G11B 19/04 |
| | | | 360/60 |
| 2019/0347020 A1* | 11/2019 | Allo | G06F 3/0619 |
| 2022/0035575 A1 | 2/2022 | Hillier et al. | |

OTHER PUBLICATIONS

Hewlett Packard Enterprise Development LP, "HP Command View for Tape Libraries Software—Secure Manager," accessed Jul. 28, 2020, <https://support.hpe.com/hpesc/public/docDisplay? docLocale=en_US&docid=emr_na-c00796549#N10013> (10 pages).

Hewlett Packard Enterprise Development LP, "HPE StoreEver MSL 3040 Tape Library—Secure Manager," accessed Jul. 29, 2020, <https://support.hpe.com/hpesc/public/docDisplay? docId=a00041302en_us&docLocale=en_US> (4 pages).

Hewlett Packard Enterprise Development LP, U.S. Appl. No. 16/941,688 entitled Restricted Transport Storage Cartridges filed Jul. 29, 2020 (42 pages).

HPE Support Center; "HP StorageWorks MSL8096 Tape Library—Operator Control Panel (OCP)"; 9 pages; printed on Dec. 11, 2019 from webpage: https://support.hpe.com/hpsc/doc/public/display?docId=emr_na-c01056168.

IBM, "Setting the write-protect switch on an LTO tape cartridge," retrieved Dec. 3, 2019, <https://www.IBM.com/support/knowledgecenter/en/STCMML8/com.IBM.storage.ts3500.doc/ipg_3584_mewpsw.html> (1 page).

Iwasaki, N., et al.; "IBM® TS7700 Series Best Practices"; Jul. 2015; 44 pages.

Quantaum; "User's Guide Scalar i6000"; Sep. 2014; 718 pages.

Spectralogic.com; "Spectra Stack Library User Guide"; Mar. 2019; 214 pages.

Ultrium LTO; "Data Protection's Future is Bright"; Aug. 21, 2018; 3 pages.

Wikipedia, NVM Express last edited Jun. 4, 2020 (12 pages).

Wikipedia, SCSI last edited Jan. 18, 2020 (9 pages).

\* cited by examiner

WRITE PROTECTION FOR STORAGE CARTRIDGES

BACKGROUND

Storage systems may store digital information in a tape cartridge. A tape drive is an electronic device that can read data from, write data to, and initialize a tape cartridge. A tape cartridge may include and house a reel of tape and may be loaded into the tape drive to make the tape cartridge available for reading, writing, and/or initialization. The tape housed in the tape cartridge is in the form of an elongated storage medium that is movable across a tape head of a tape drive. The storage medium of a tape cartridge can include a magnetic storage medium or an optical storage medium.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "tape library" can refer to a physical structure in which multiple tape cartridges can be housed. The tape cartridges may be physically stored in physical storage slots of the tape library. A physical storage slot is a receptacle or chamber in which a tape cartridge can be placed and removed.

The tape library can also include a tape cartridge transport device (or multiple tape transport devices) and a tape drive (or multiple tape drives). A tape cartridge transport device can include a robot, a tape cartridge picker, a tape cartridge gripper, a tape cartridge carriage, or any other type of mechanism to transport a tape cartridge. The tape cartridge transport device can physically transport a tape cartridge from a physical storage slot to a tape drive, and vice versa.

A tape drive includes a motor to rotate a reel of a tape cartridge that is loaded in the tape drive. The rotation of the tape cartridge reel causes winding or unwinding of a tape in the tape cartridge, which causes the tape to move in the tape cartridge or into or out of the tape cartridge. The tape drive also includes a tape head with read elements and write elements to read data on a tape of the tape cartridge and to write data to the tape.

A tape library may receive commands from a user or computing device to transport a tape cartridge from a storage slot and load the tape cartridge into a tape drive. The commands received by the tape library are processed by machine-readable instructions stored on machine-readable storage media and executed by a processing resource of the tape library.

A tape cartridge can be loaded into or unloaded from a tape drive. Loading a tape cartridge into a tape drive allows a remote initiator (a user, a computing device, or another entity) to perform a read and write of the tape in the tape cartridge. A remote initiator refers to an entity that is separate from the tape library, but which may be able to access the tape library over a communication medium such as a wired network, wireless network, or another type of communication medium.

In some examples, the tape cartridges in a tape library are used to store backup data of a host system. The host system for which the tape cartridges are to store backup data can include a computing device or multiple computing devices. "Backup data" refers to data that is based on primary data in the host system, where the backup data can refer to a copy of the primary data or to any other data computed based on the primary data in from which the primary data can be recovered if the primary data were lost or corrupted for any reason. In other examples, tape cartridges in a tape library can be used to store archived data or other types of data.

A malware attack can attempt to remove or corrupt the primary data stored in a host system. In addition, the malware attack may also attempt to remove or corrupt the data stored in a backup system such as a tape library. An example of such a malware attack is a ransomware attack, in which an unauthorized entity (e.g., a user, a program, or a machine) encrypts the data in a host system as well as in a backup storage system such as a tape library. The encryption of the data in the host system and in the tape library can use an encryption key. Without the encryption key, the encrypted data is unrecoverable by users of the host system.

Although reference is made to a tape library in some examples, it is noted that techniques or mechanisms according to some implementations of the present disclosure can be applied to other types of storage systems or storage pools that include storage cartridges that can be transported to storage drives for reading, writing, and initialization. "Transporting" a storage cartridge in a storage system refers to physically moving the storage cartridge between different physical locations in the storage system. An example of another type of storage system is a disk-based storage system or a solid state storage system in which a storage cartridge includes a disk-based storage cartridge or a solid state drive (SSD), respectively. A disk-based storage cartridge stores data on a rotatable medium, such as a magnetic medium or an optical medium. An SSD includes an integrated circuit memory device to store data. A mechanism can be provided to define what is the subject of the write protection. For example, the mechanism can identify a specific storage cartridge or a group of storage cartridges to be protected, based on identifier(s) of the storage cartridge(s).

In accordance with some implementations of the present disclosure, a storage controller (such as a storage controller in a storage system or a storage controller external of the storage system) checks whether a storage cartridge in the storage system is associated with an indication set during a configuration operation (such as by an administrator using a management interface of the storage system to indicate write protection is enabled for the storage cartridge). For example, in a storage library such as a tape library, the storage controller can include a library controller.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

Note that the storage controller is not part of a host system that can request reads and writes of storage cartridges in the storage system. Note also that the "indication set during a configuration operation" is an electronically set indication (e.g., an indication set in an electronic memory during the configuration operation), in contrast to a physical switch or tab on the storage cartridge that can be physically adjusted, by a human, to a position to indicate write protection.

In response to determining that the storage cartridge is associated with the indication, the controller triggers the write protection for the storage cartridge to prevent writing of data to the storage cartridge if the storage cartridge already contains previously written data (e.g., an amount of data that exceeds a specified threshold, where the specified threshold can be a zero value or a non-zero value). The write protection provides protection against any of various different types of writes, such as a write that records data to the storage cartridge (as new data or to replace previously written data), a data erase (to erase the data stored by the storage cartridge), a cartridge reformat operation, a write of metadata such as a file mark, certain modifications of the content in a cartridge memory of the storage cartridge (the cartridge memory is separate from the main storage medium, such as tape, of the storage cartridge), and so forth.

Example Storage Arrangement

Figure 1:
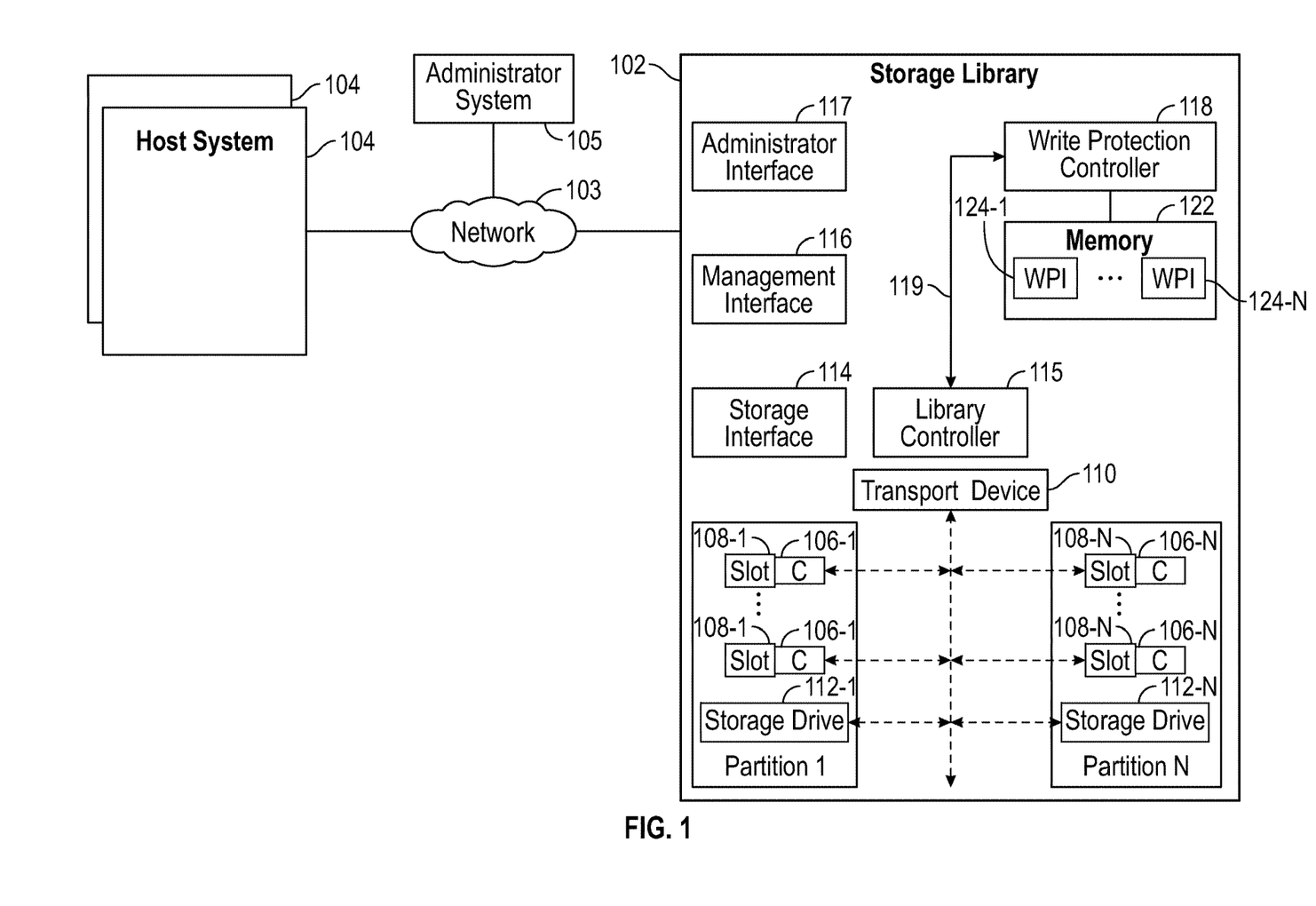
FIG. 1 is a block diagram of an arrangement including a storage library according to some examples.

FIG. 1 is a block diagram of an example arrangement that includes a storage library 102 (e.g., a tape library or another type of storage library) that is accessible by a host system 104 (or by any of multiple host systems 104). Communications between the host systems 104 and the storage library 102 can occur over a network 103, such as a local area network (LAN), a wide area network (WAN), a storage area network (SAN), the Internet, and so forth. The network 103 can include a wired network and/or a wireless network.

A host system 104 includes a computing device (or multiple computing devices) that is (are) able to issue requests to access data stored in storage cartridges in the storage library 102. For example, a host system 104 can access data in storage cartridges of the storage library 102 as part of a data backup operation in which primary data stored by the host system 104 (or by another system) is copied to the storage library 102 to be stored in a storage cartridge (or multiple storage cartridges).

A host system 104 can also access data in storage cartridge(s) of the storage library 102 by reading the data of the storage cartridge(s), such as during a restore operation in which data stored by the storage cartridge(s) is copied back to the host system 104 or another system. The restore operation can be used to restore a corrupted or missing primary data.

In other examples, access of data stored in storage cartridge(s) of the storage library 102 can be part of other types of operations by the host system(s) 104.

In the example of FIG. 1, storage cartridges are divided into multiple partitions 1 through N (where N≥2). In other examples, the storage cartridges in the storage library 102 are not divided into multiple partitions. A "partition" refers to a subset of storage cartridges in the storage library 102 that are either physically or logically separated from another subset of storage cartridges in the storage library 102. The storage cartridges in the different partitions can be accessed by respective different host systems, or can be used to store different types of data, or for any other purpose.

In the example of FIG. 1, storage cartridges 106-1 are removably mounted in physical storage slots (or more simply "storage slots") 108-1 of partition 1. Similarly, storage cartridges 106-N are removably mounted in storage slots 108-N of partition N.

Note that a storage cartridge 106-$i$ ($i$=1 to N) can be removed from a corresponding storage slot 108-$i$ for transport by a transport device 110 to a different location in the storage library 102, such as to a storage drive 112-$i$ in partition $i$ or to another storage slot in partition $i$. Each partition $i$ can include a single storage drive 112-$i$ or multiple storage drives.

Although just one transport device 110 is shown in FIG. 1, in other examples, the storage library 102 can include multiple transport devices. A "transport device" can refer to any mechanism that can physically transport a storage cartridge between different locations in the storage library 102. Examples of transport devices include pickers, robots, grippers, carriages, and so forth.

In examples according to FIG. 1, the storage library 102 includes a storage interface 114 and a management interface 116 that is separate from the storage interface 114. The storage interface 114 is used to communicate data and control information between the storage library 102 and a host system 104. The data that is communicated through the storage interface 114 includes write data that is transmitted by a host system 104 to the storage library 102 to store in a storage cartridge, or read data that is retrieved from a storage cartridge and transmitted to a host system 104.

Control information that can be communicated through the storage interface 114 can include commands received from a host system 104 to perform a data access operation in the storage library 102, such as storage cartridge transport operation, a write operation, or a read operation. Additionally, the commands can include commands to determine a status of the storage library 102 (or a portion of storage library 102).

In some examples, the storage interface 114 is a Small Computer System Interface (SCSI) through which the storage library 102 is able to receive SCSI commands from a host system 104, and through which write or read data is exchanged.

In other examples, the storage interface 114 includes a NON-VOLATILE MEMORY EXPRESS (NVMe™) interface through which NVMe™ commands and data can be exchanged.

In further examples, the storage interface 114 can be according to another protocol, whether standardized, proprietary, or open source.

The management interface 116 of the storage library 102 is separate from the storage interface 114, and provides a separate communications path between an external entity and the storage library 102. An "external entity" is an entity (e.g., a program, a machine, a human, etc.) that is external of the storage library 102. For example, the external entity can include a host system 104, an administrator system 105

(e.g., a computing system associated with an administrator for the storage library 102), and so forth.

The management interface 116 is used to perform various management tasks with respect to the storage library 102, including configurations of the storage library 102, monitoring of the storage library 102, and so forth. An example of the management interface 116 is a Representational State Transfer (REST) application programming interface (API), which can be used for providing web services (referred to as RESTful web services). A REST API supports various routines (also referred to as methods) and rules defining how an external entity is to interact with the storage library 102 through the management interface 116.

In further examples, the storage library 102 can also include an administrator interface 117, which can be referred to as a remote management interface (RMI) in some examples. The administrator interface 117 can be in the form of a dedicated website that is accessible by authorized persons (e.g., an administrator using the administrator system 105) to perform configurations of the storage library 102. When the website presented by the administrator interface 117 is accessed by a system such as the administrator system 105, a web-based user interface may be presented at the administrator system 105, such as in a web browser. An administrator can use the web-based user interface to perform management tasks with respect to the storage library 102.

Although referred to as an "administrator interface," the administrator interface 117 can be considered a management interface, except of a form different from the management interface 116. Either the administrator interface 117 or the management interface 116 can be used to initiate a configuration operation in the storage library 102.

The storage library 102 also includes a write protection controller 118 according to some implementations of the present disclosure. The write protection controller 118 is used to set an indication (e.g., any of 124-1 to 124-N) that controls whether or not write protection is to be provided for a storage cartridge.

The storage library 102 includes a memory 122, which can be implemented using a memory device or multiple memory devices. A memory device can include a dynamic random access memory (DRAM) device, a static random access memory (SRAM) device, a flash memory device, or any other type of memory device.

The memory 122 can store information, including indications 124-1 to 124-N associated with respective partitions 1 to N. The indications 124-1 to 124-N are write protection indications (WPIs), which are set by the write protection controller 118 during a configuration operation of the storage library 102. The configuration operation can be initiated by the administrator system 105 or by another system.

In examples according to FIG. 1, the WPI 124-1 is associated with partition 1, such that any storage cartridges 106-1 in partition 1 are write protected storage cartridges. Similarly, the WPI 124-N is associated with partition N, such that any storage cartridges 106-N in partition N are write protected storage cartridges.

A "write protected storage cartridge" refers to a storage cartridge for which write protection is provided, such that a storage drive is configured by the storage library 102 to prevent writing of the storage cartridge if the storage cartridge stores previously written data.

In other examples, instead of associating WPIs with respective partitions in the storage library 102, WPIs can be associated with individual storage cartridges (i.e., one WPI per individual storage cartridge) or can be associated with a different subset of storage cartridges.

A WPI can refer to any type of indicator (in the form of a flag, a variable or parameter, or any other information element) that can be set to any of multiple different values (e.g., "0" and "1"). A WPI corresponds to the indicator being set to a first value. If the indicator is set to a second value different from the first value, then the WPI is not set for the corresponding storage cartridge, partition, or other subset of storage cartridges.

The storage library 102 also includes a library controller 115 that controls operations within the storage library 102. In some examples, the library controller 115 can process any of various commands received through the storage interface 114, and the library controller 115 performs corresponding actions in response to the commands. For example, the library controller 115 can command the transport device 110 to transport a storage cartridge 106-$i$ from a storage slot 108-$i$ to a storage drive 112, and to cause loading of the storage cartridge 106-$i$ into the storage drive 112. As a further example, the library controller 115 can cause a storage cartridge 106-$i$ to be unloaded from a storage drive 112 and transported to a storage slot 108-$i$.

In examples where the write protection controller 118 is separate from the library controller 115, the write protection controller 118 and the library controller 115 can communicate with one another over a communication link 119.

In other examples, the write protection controller 118 can be part of the library controller 115.

Figure 2:
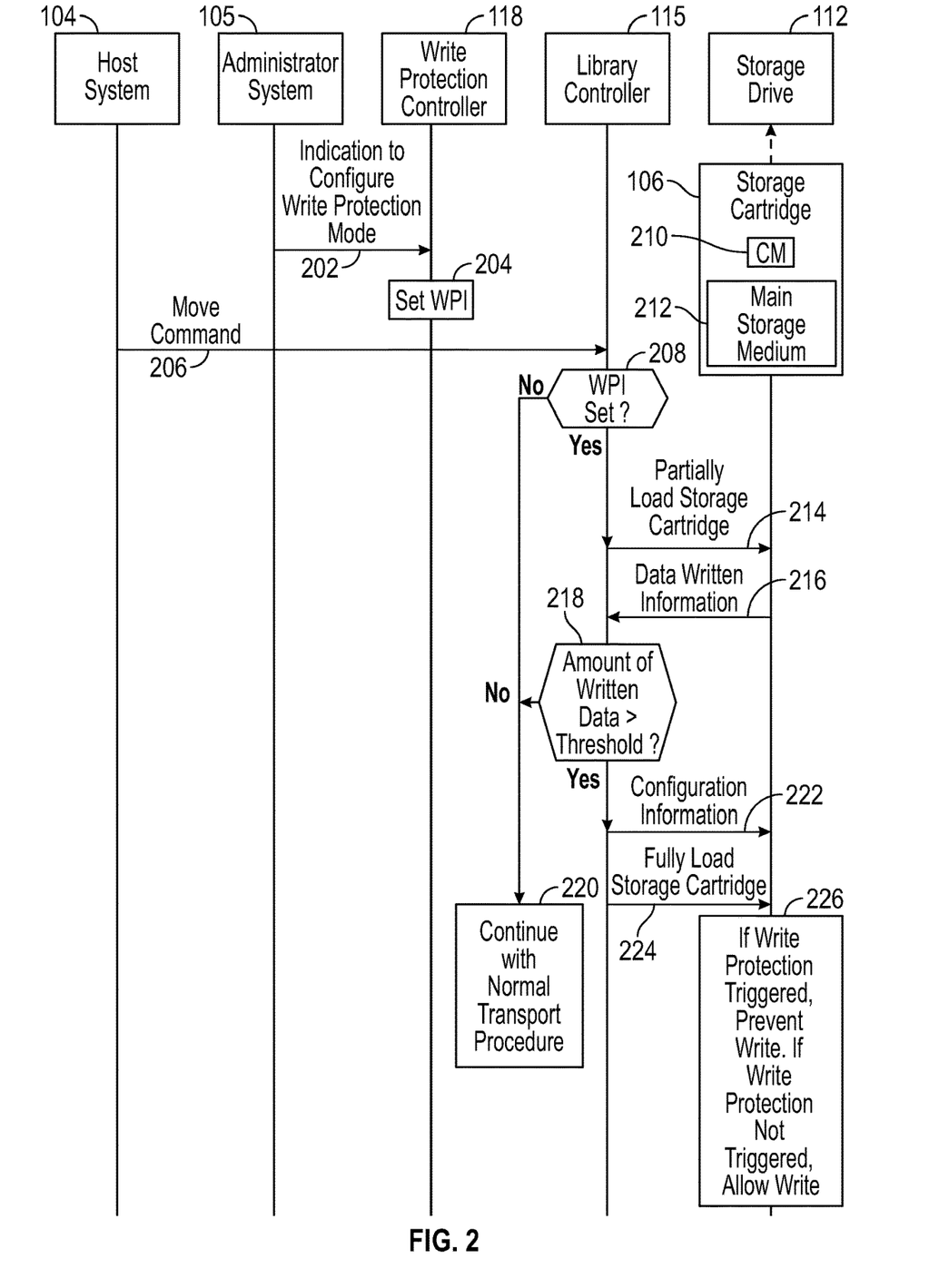
FIG. 2 is a message flow diagram of a process according to some examples.

FIG. 2 is a flow diagram of a process that can be performed among the various entities shown in the FIG. 1. In some examples, an administrator or other user at the administrator system 105 can initiate a configuration operation to configure write protection in the storage library 102. For example, a user interface can be presented by the administrator system 105, where the user interface can be used by the user at the administrator system 105 to initiate the write protection configuration operation. In some examples, the write protection configuration operation can be via the administrator interface 117 of the storage library 102 (FIG. 1).

As an example, the user at the administrator system 105 can log into the storage library 102 through the administrator interface 117. The user can submit the user's credential (such as an administrator credential) to successfully log into the administrator interface. After successful login, the user can initiate a write protection configuration operation.

Although reference is made to a human initiating the write protection mode configuration, in other examples, a program or a machine can initiate the write protection mode configuration, assuming that the program and machine has the appropriate authorization and can be authenticated.

Also, although reference is made in some examples to the administrator system 105 initiating the write protection mode configuration, in other examples, a different system can be used to initiate the write protection configuration of the storage library 102.

The administrator system 105 sends (at 202) an indication to configure a write protection mode to the administrator interface 117 of the storage library 102. The indication to configure write protection mode can specify that the write protection mode is to be activated for a partition, an individual storage cartridge, or a different subset of storage cartridges. In some cases, the indication to configure write protection mode can specify that write protection mode is to be activated for multiple partitions.

The indication to configure the write protection mode can be in the form of a message, an information element, or any other type of information that provides an indication that write protection mode configuration is requested. The indication to configure write protection mode is received by the write protection controller 118 in the storage library 102 through the administrator interface 117.

In response to the indication to configure the write protection mode, the write protection controller 118 sets (at 204) a WPI (e.g., one of WPIs 124-1 to 124-N in FIG. 1). The WPI that is set can be for a partition, an individual storage cartridge, or another subset of storage cartridges. The set WPI is stored in a memory (e.g., 122 in FIG. 1) of the storage library 102.

At a later time, a host system 104 sends (at 206) a move command (e.g., a SCSI MOVE COMMAND, an NVMe™ command to move a storage cartridge, etc.) to the storage library 102, which is received by the library controller 115 in the storage library 102. The move command is to request a transport of a storage cartridge 106 from a storage slot in the storage library 102 to a storage drive 112. The storage drive 112 of FIG. 2 is one of the storage drives 112-1 to 112-N shown in FIG. 1.

In response to the move command, the library controller 115 checks (at 208) whether the WPI for the storage cartridge 106 is set. Note that the WPI can be associated individually with the storage cartridge 106, can be associated with a partition in which the storage cartridge 106 is part of, or can be associated with another subset of storage cartridges.

The library controller 115 can access the WPI in the memory 122 to check whether the WPI is set. In examples where the write protection controller 118 is separate from the library controller 115 in the storage library 102, the library controller 115 can communicate with the write protection controller 118 to retrieve the WPI from the memory 122.

In some examples, in response to determining that the WPI is set, the library controller 115 causes partial loading (at 214) of the storage cartridge 106 into the storage drive 112. In such examples, the storage cartridge 106 can have a partially loaded position and a fully loaded position. In the partially loaded position, a reader in the storage drive 112 is able to read a cartridge memory 210 that is part of the storage cartridge 106. The cartridge memory 210 in some examples can be a radio-frequency identification (RFID) chip. Information stored in a memory of the RFID chip can be read wirelessly by an RFID reader. In other examples, the cartridge memory 210 may be implemented with a different type of memory device.

The cartridge memory 210 is separate from a main storage medium 212 (e.g., tape storage medium) of the storage cartridge 106. The main storage medium 212 is used to store data that is written in response to write commands from the host system 104.

In some examples, the cartridge memory 210 can store data written information, which can indicate an amount of data that has been previously written to a main storage medium 212 of the storage cartridge 106. The reader of the storage cartridge 106 can read the data written information, which is sent (at 216) to the library controller 115. In further examples, the data written information can be read when the storage cartridge 106 is outside of the storage drive 112, which may be possible in examples where the cartridge memory 210 is in an RFID chip.

In other examples, instead of storing the data written information in the cartridge memory 210, the data written information can be stored in a designated portion of the main storage medium 212, which can be a region of the main storage medium 212 that is used to store metadata for the main storage medium 212. In such examples, the storage cartridge 214 would be fully loaded into the storage drive 112 to read the data written information from the designated portion of the main storage medium 212. The storage drive 112 would not allow any writes to the storage cartridge 214 unless specifically given permission to do so.

In response to receiving the data written information (received at 216), the library controller 115 determines (at 218) whether the amount of previously written data stored in the storage cartridge 106 exceeds a specified threshold (which can be a zero value or a non-zero value).

If the WPI is set for the storage cartridge 106 and the amount of previously written data in the storage cartridge 106 is greater than or equal to the specified threshold, then the library controller 118 determines that write protection is to be set for the storage cartridge 106. On the other hand, if either the WPI is not set or the amount of the previously written data in the storage cartridge 106 is less than the threshold, then the library controller 115 determines that write protection is not to be set for the storage cartridge 106, and instead continues with the normal transport procedure of loading the storage cartridge 106 without setting write protection for the storage cartridge 106.

In response to determining (at 218) that the amount of previously written data stored in the storage cartridge 106 exceeds a specified threshold, the library controller 115 sends (at 222) configuration information to the storage drive 112. The configuration information can include an indication that the write protection mode has been triggered, in response to the library controller 115 determining that the write protection should be triggered. On the other hand, the configuration information can include an indication that write protection is not to be triggered, in response to the library controller 115 determining that write protection is not to be triggered for the storage cartridge 106.

In examples where the storage cartridge 106 is partially loaded into the storage drive 106 to read the cartridge memory 210, the library controller 115 causes full loading (at 224) of the storage cartridge 106 into the storage drive 106.

After the full loading, if the configuration information indicates that write protection is triggered, the storage drive 112 prevents (at 226) writing of data to the storage cartridge 106, in response to a write command received from the host system 104. The write command can be a command to record data in the storage cartridge 106, an erase command to erase data of the storage cartridge, a reformat command to reformat the storage cartridge, a metadata write command to write metadata (e.g., a file mark) to the storage cartridge, a command to modify certain content of the cartridge memory 210, and so forth. Thus, preventing a write of data to the storage cartridge 106 can include prevent any type of modification of data of the storage cartridge 106 in response to any of the foregoing possible types of write commands. However, if the configuration information indicates that write protection has not been triggered, then the storage drive 112 allows (at 226) the write requested by the write command to proceed to write data to the storage cartridge 106.

In some examples as discussed above, the setting of the WPI (at 204) involves the write protection controller 118 writing a value to the memory 122 of the storage library 102 (FIG. 1).

In other examples, instead of or in addition to writing the value to the memory 122 of the storage library 102 to set the WPI, the write protection controller 118 can write a value to a memory (e.g., the cartridge memory 210 or the designated portion of the main storage medium 212) of the storage cartridge 106 to indicate that write protection is to be activated for the storage cartridge.

In some examples, the write protection indication written to the memory (e.g., 210 or 212) of the storage cartridge 106 may be accessible by the host system 104. As a result, it may be possible that the host system 104 can erase or modify the write protection indication written to the memory of the storage cartridge 106. In such examples, the write protection controller 118 can implement a technique to protect the write protection indication written to the memory of the storage cartridge 106. For example, the write protection controller 118 can read the write protection indication from the memory of the storage cartridge 106 when the storage cartridge 106 is initially loaded in the storage drive 112, write a corresponding write protection indication to a memory (e.g., 122) of the storage library 102, and check the write protection indication in the memory of the storage cartridge 106 when the storage cartridge 106 is unloaded. If the write protection indication in the memory of the storage cartridge 106 does not match the write protection indication saved to the memory of the storage library 102, then the write protection controller 118 can rewrite the write protection indication to the memory of the storage cartridge 106. As a further example, another way of protecting the write protection indication is to have write protection set for the storage drive 112 also apply to the portion of the memory of the storage cartridge 106 that stores the write protection indication.

In other examples, other protection mechanisms can be used to protect the write protection indication in the memory of the storage cartridge 106 from unauthorized access or modification.

Figure 3:
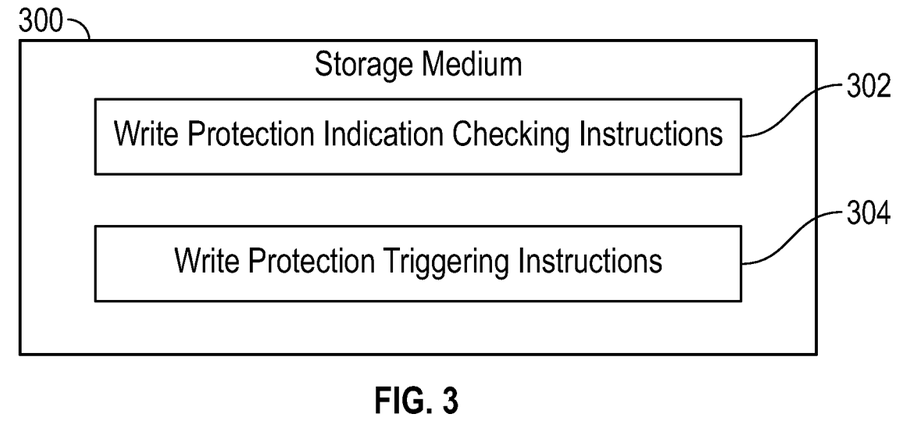
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a controller (e.g., 115 and/or 118 in FIG. 1) (which is for a storage system separate from a host system) to perform various tasks.

The machine-readable instructions can include write protection indication checking instructions 302 to check whether a storage cartridge in the storage system (e.g., storage library 102 of FIG. 1) is associated with an indication (e.g., WPI discussed above) set, in an electronic memory (e.g., the memory 122 of the storage library 102) during a configuration operation in the storage system to indicate write protection is enabled for the storage cartridge.

In some examples, the configuration operation is responsive to access by an entity (e.g., administrator system 105 of FIG. 1) through a management interface (e.g., administrator interface 117 of FIG. 1) of the storage system. The management interface is separate from a storage interface (e.g., 114 in FIG. 1) of the storage system.

The machine-readable instructions can further include write protection triggering instructions 304 to, in response to determining that the storage cartridge is associated with the indication, trigger the write protection for the storage cartridge to prevent writing of data to the storage cartridge if the storage cartridge already contains previously written data.

In some examples, the controller loads the further storage cartridge into a storage drive, and enables writing of data to the further storage cartridge if the further storage cartridge does not store more than a specified amount (zero or more) of data. In some examples, the controller receives information from the storage drive indicating that the further storage cartridge does not store more than the specified amount of data.

In some examples, the controller disables a write protection mode for the storage cartridge during a write operation for writing the previously written data to the storage cartridge. This allows the write operation (e.g., a data backup operation, an archival operation, etc.) to proceed with respect to the storage cartridge. After the write operation has completed, the controller activates the write protection mode responsive to the storage cartridge being unloaded from a storage drive in the storage system for greater than a specified time duration. Unloading of the storage cartridge from the storage drive for greater than the specified time duration provides an indication that writing of data to the storage cartridge has completed, and the storage cartridge has been moved to a storage slot for safekeeping.

In further examples, the storage cartridge is unloaded from the storage drive but then is loaded back into the storage drive before the specified time duration has expired. In such examples, the write protection mode is not set by the controller. This can be used in a scenario where further data is to be appended to previously written data of the storage cartridge (e.g., to continue a data backup operation). If the host system determines that the write operation is complete (e.g., the data backup operation is complete), then the host system does not request transport of the storage cartridge back to the storage drive, which allows the specified time duration to expire and the write protection mode to be set.

In some examples, after the triggering of the write protection for the storage cartridge, the controller disables the write protection after passage of a specified amount of time (e.g., six months or a different time duration). For example, the passage of the specified amount of time can correspond to a data retention policy of an enterprise or other entity. The data retention policy can specify that data of the enterprise or other entity is to be maintained for the specified amount of time, following which the data can be discarded. Write protection can be disabled after specified amount of time to allow for the storage cartridge to be used in a subsequent write operation.

Figure 4:
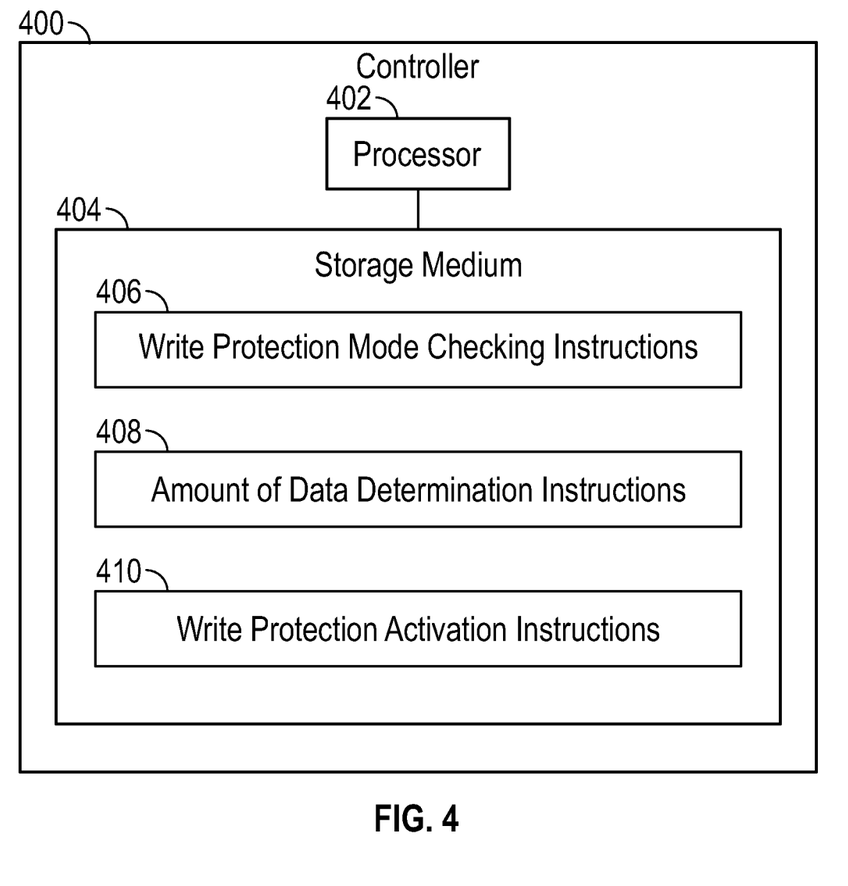
FIG. 4 is a block diagram of a computer according to some examples.

FIG. 4 is a block diagram of a controller 400 according to some examples. The controller 400 includes a processor 402 (or multiple processors). A processor can include a microprocessor, a core of a multi-core microprocessor, a microcontroller, a programmable integrated circuit, a programmable gate array, or another hardware processing circuit.

The controller 400 further includes a storage medium 404 that stores machine-readable instructions executable on the processor 402 to perform various tasks. Machine-readable instructions executable on a processor can refer to the instructions executable on a single processor or the instructions executable on multiple processors.

The machine-readable instructions in the storage medium 404 include write protection mode checking instructions 406 to check whether a write protection mode is active for a storage cartridge in a storage system.

The machine-readable instructions further include amount of data determination instructions 408 and write protection activation instructions 410 that are executed in response to determining that the write protection mode is active for the storage cartridge.

The amount of data determination instructions 408 determine whether a specified amount of data (e.g., greater than zero or another threshold) is stored in the storage cartridge.

In response to determining that the specified amount of data is stored in the storage cartridge, the write protection activation instructions 410 configure a storage drive to activate write protection to prevent writing of data to the storage cartridge.

In some examples, the machine-readable instructions read information in a memory (e.g., cartridge memory or a designated portion of the main storage medium) of the storage cartridge to determine whether the specified amount of data was previously written to the storage cartridge.

Figure 5:
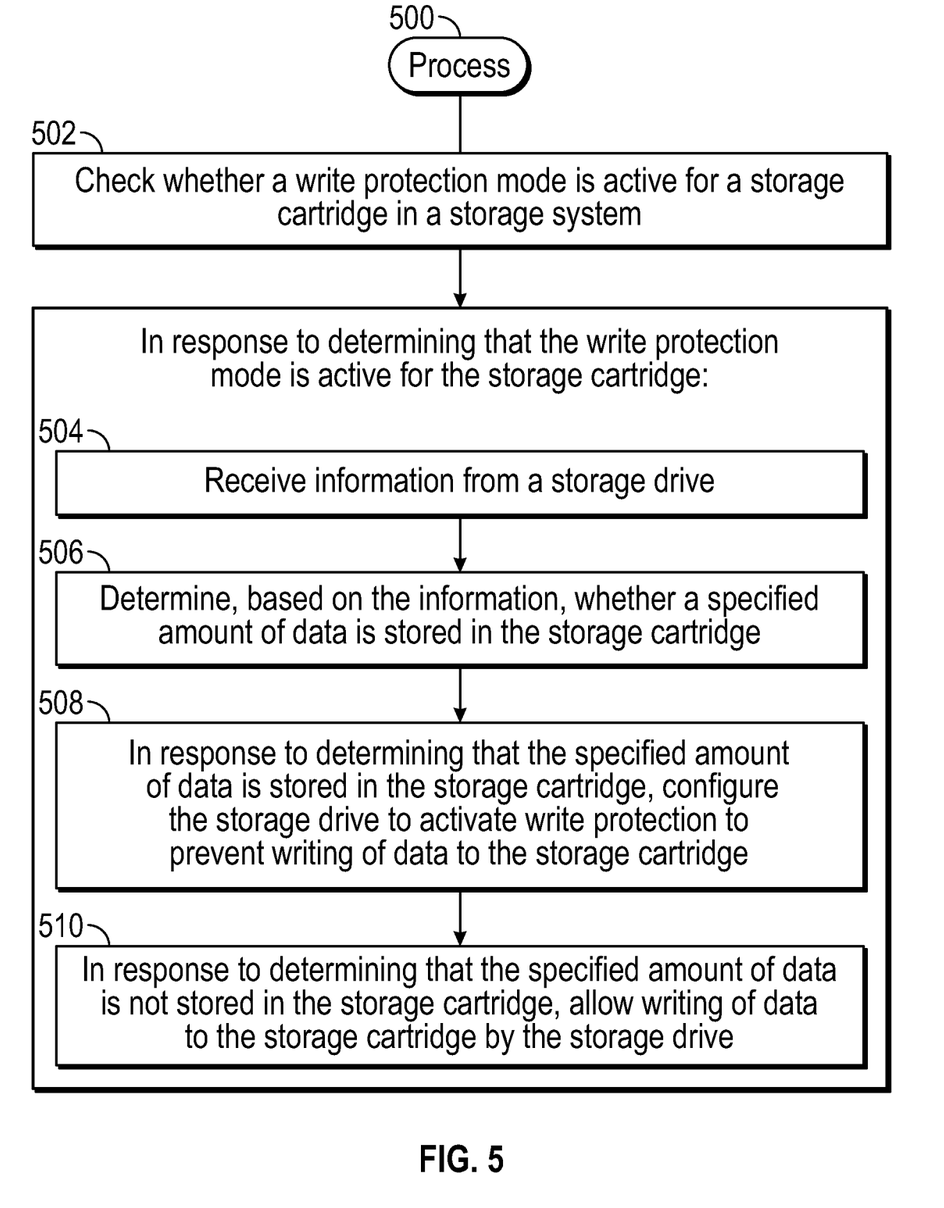
FIG. 5 is a flow diagram of a process according to some examples.

FIG. 5 is a flow diagram of a process 500 according to some implementations of the present disclosure. The process 500 can be performed by the write protection controller 118, for example.

The process 500 includes checking (at 502) whether a write protection mode is active for a storage cartridge in a storage system.

The process 500 performs the following tasks in response to determining that the write protection mode is active for the storage cartridge. The process 500 receives (504) information from a storage drive, where the information is read by the storage drive from a memory of the storage cartridge.

The process 500 determines (at 506), based on the information, whether a specified amount of data is stored in the storage cartridge. In response to determining that the specified amount of data is stored in the storage cartridge, the process 500 configures (at 508) the storage drive to activate write protection to prevent writing of data to the storage cartridge. In response to determining that the specified amount of data is not stored in the storage cartridge, the process 500 allows (at 510) writing of data to the storage cartridge by the storage drive.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a controller for a storage system, separate from a host system, to:
   check whether a storage cartridge in the storage system is associated with an indication set, in an electronic memory of the storage system, during a configuration operation in the storage system for a partition of the storage system to indicate that write protection is enabled for a plurality of storage cartridges mounted in the partition, wherein the plurality of storage cartridges include the storage cartridge, the electronic memory of the storage system is separate from the storage cartridge, and wherein the checking comprises reading, by the controller, the indication from the electronic memory of the storage system, and
   in response to determining, based on reading the indication from the electronic memory of the storage system, that the write protection is enabled for the plurality of storage cartridges, enable the write protection for the plurality of storage cartridges in the partition, including triggering the write protection for the storage cartridge to prevent writing of data to the storage cartridge if the storage cartridge already contains previously written data.

2. The non-transitory machine-readable storage medium of claim 1, wherein the configuration operation is responsive to access by an entity through a management interface of the storage system, the management interface being separate from a second interface of the storage system, the second interface for communicating with the host system.

3. The non-transitory machine-readable storage medium of claim 1, wherein the instructions upon execution cause the controller to:
   load a further storage cartridge of the plurality of storage cartridges mounted in the partition into a storage drive, wherein the write protection is enabled for the further storage cartridge based on the indication set in the electronic memory; and
   enable writing of data to the further storage cartridge if the further storage cartridge does not store more than a specified amount of data.

4. The non-transitory machine-readable storage medium of claim 3, wherein the instructions upon execution cause the controller to:
   receive information from the storage drive indicating that the further storage cartridge does not store more than the specified amount of data,
   wherein the enabling of the writing of data to the further storage cartridge is based on the information and comprises configuring the storage drive to disable the write protection for the further storage cartridge.

5. The non-transitory machine-readable storage medium of claim 1, wherein the instructions upon execution cause the controller to:
   receive a command to transport the storage cartridge from a storage slot in the storage system to a storage drive in the storage system,
   wherein the reading of the indication from the electronic memory that is separate from the storage cartridge is performed in response to the command to transport.

6. The non-transitory machine-readable storage medium of claim 1, wherein the instructions upon execution cause the controller to:
   in response to detecting the indication set in the electronic memory, cause partial loading of the storage cartridge in a storage drive;

while the storage cartridge is partially loaded in the storage drive, read information in a cartridge memory of the storage cartridge;

determine, based on the information read from the cartridge memory, whether an amount of data stored in the storage cartridge exceeds a threshold; and in response to determining based on the information read from the cartridge memory while the cartridge memory is partially loaded in the storage drive that the amount of data stored in the storage cartridge exceeds the threshold, trigger the write protection for the storage cartridge.

7. The non-transitory machine-readable storage medium of claim 1, wherein the instructions upon execution cause the controller to:

disable a write protection mode for the storage cartridge during a write operation for writing the previously written data to the storage cartridge when the storage cartridge is loaded in a storage drive in the storage system; and activate the write protection mode responsive to the storage cartridge being unloaded from the storage drive for greater than a specified time duration.

8. The non-transitory machine-readable storage medium of claim 1, wherein the instructions upon execution cause the controller to:

determine a presence of the previously written data in the storage cartridge based on reading information in a memory of the storage cartridge, wherein the triggering of the write protection is based on the information indicating the presence of the previously written data in the storage cartridge.

9. The non-transitory machine-readable storage medium of claim 1, wherein the instructions upon execution cause the controller to:

write a value to a memory of the storage cartridge, the value indicating that the storage cartridge is write protected.

10. The non-transitory machine-readable storage medium of claim 1, wherein the instructions upon execution cause the controller to:

after the triggering of the write protection for the storage cartridge, disable the write protection after passage of a specified amount of time.

11. A controller for a storage system separate from a host system, comprising:

a processor; and a non-transitory storage medium storing instructions executable on the processor to:

check whether a storage cartridge in the storage system is associated with an indication set, in an electronic memory of the storage system, during a configuration operation in the storage system for a partition of the storage system to indicate that write protection is enabled for a plurality of storage cartridges mounted in the partition, wherein the plurality of storage cartridges include the storage cartridge, the electronic memory of the storage system is separate from the storage cartridge, and wherein the checking comprises reading, by the controller, the indication from the electronic memory of the storage system; and in response to determining, based on reading the indication from the electronic memory of the storage system, that the write protection is enabled for the plurality of storage cartridges, enable the write protection for the plurality of storage cartridges in the partition, including triggering the write protection for the storage cartridge to prevent writing of data to the storage cartridge if the storage cartridge already contains previously written data.

12. The controller of claim 11, wherein the instructions are executable on the processor to:

read information in a memory of the storage cartridge to determine an amount of data that was previously written to the storage cartridge; and trigger the write protection for the storage cartridge based on comparing the determined amount of data to a threshold amount of data.

13. The controller of claim 11, wherein the instructions are executable on the processor to:

in response to determining that the write protection is enabled for a further storage cartridge of the plurality of storage cartridges and determining that a threshold amount of data is not stored in the further storage cartridge, allow writing of data to the further storage cartridge.

14. The controller of claim 11, wherein the instructions are executable on the processor to:

load a further storage cartridge of the plurality of storage cartridges in the partition into a storage drive; and enable writing of data to the further storage cartridge in response to determining that the write protection is enabled for the plurality of storage cartridges in the partition and the further storage cartridge does not store more than a threshold amount of data.

15. A method of a controller for a storage system separate from a host system, comprising:

checking, by the controller, whether a storage cartridge in the storage system is associated with an indication set, in an electronic memory of the storage system, during a configuration operation in the storage system for a partition of the storage system to indicate that write protection is enabled for a plurality of storage cartridges mounted in the partition, wherein the plurality of storage cartridges include the storage cartridge, the electronic memory of the storage system is separate from the storage cartridge, and wherein the checking comprises reading, by the controller, the indication from the electronic memory of the storage system; and in response to determining, based on reading the indication from the electronic memory of the storage system, that the write protection is enabled for the plurality of storage cartridges, enabling, by the controller, the write protection for the plurality of storage cartridges in the partition, including triggering the write protection for the storage cartridge to prevent writing of data to the storage cartridge if the storage cartridge already contains previously written data.

16. The method of claim 15, further comprising:

loading a further storage cartridge of the plurality of storage cartridges in the partition into a storage drive; and enabling writing of data to the further storage cartridge in response to determining that the write protection is enabled for the plurality of storage cartridges in the partition and the further storage cartridge does not store more than a threshold amount of data.

17. The controller of claim 11, wherein the instructions are executable on the processor to:

receive a command to transport the storage cartridge from a storage slot in the storage system to a storage drive in the storage system, wherein the reading of the indication from the electronic memory that is separate from the storage cartridge is performed in response to the command to transport.

18. The controller of claim 11, wherein the instructions are executable on the processor to:
- in response to detecting the indication set in the electronic memory, cause partial loading of the storage cartridge in a storage drive;
- while the storage cartridge is partially loaded in the storage drive, read information in a cartridge memory of the storage cartridge;
- determine, based on the information read from the cartridge memory, whether an amount of data stored in the storage cartridge exceeds a threshold amount of data; and
- in response to determining based on the information read from the cartridge memory while the cartridge memory is partially loaded in the storage drive that the amount of data stored in the storage cartridge exceeds the threshold amount of data, trigger the write protection for the storage cartridge.

19. The method of claim 15, comprising:
receiving, by the controller, a command to transport the storage cartridge from a storage slot in the storage system to a storage drive in the storage system,
wherein the reading of the indication from the electronic memory that is separate from the storage cartridge is performed in response to the command to transport.

* * * * *